United States Patent [19]

Boyle

[11] 3,804,456
[45] Apr. 16, 1974

[54] SAFETY DEVICE FOR AUTOMOBILES: GLARE SHIELD
[75] Inventor: John A. Boyle, Mequon, Wis.
[73] Assignee: The Raymond Lee Organization, Inc., New York, N.Y.
[22] Filed: Aug. 3, 1971
[21] Appl. No.: 168,588

[52] U.S. Cl. .............................. 296/97 E
[51] Int. Cl. .............................. B60j 3/00
[58] Field of Search ..... 296/97 R, 97 E; 280/150 R, 280/150 B; 224/29 R; 206/19.5 R; 108/45

[56] References Cited
UNITED STATES PATENTS
2,253,766  8/1941  Crowell .................. 296/97 E
2,628,140  2/1953  Bunce ..................... 108/45
2,596,836  5/1952  Bruhl ..................... 296/97 E X
2,813,749  11/1957 Wetig ..................... 296/97 E
3,003,812  10/1961 Haugland ................. 296/97 E
2,494,980  1/1950  Zuckerman ............... 108/45

Primary Examiner—Kenneth H. Betts
Assistant Examiner—Leslie J. Paperner

[57] ABSTRACT

A thin flat horizontally elongated opaque panel like shield extends across the top of the instrument panel in front of the driver in an automobile. Means secured to the shield and panel enable the shield to be pivoted to any position between horizontal and vertical.

1 Claim, 4 Drawing Figures

PATENTED APR 16 1974   3,804,456

INVENTOR.
JOHN A. BOYLE

SAFETY DEVICE FOR AUTOMOBILES: GLARE SHIELD

SUMMARY OF THE INVENTION

My invention is directed toward a safety device for automobiles which will protect the driver from glare and the like. To this end I employ a thin flat horizontally elongated panel-like shield which extends across the top of the instrument panel in front of the driver and behind the windshield. Means secured to the shield and front edge of the panel as well as being secured to the defroster vents adjacent the windshield on the top of the instrument panel enable the user to pivot the shield manually into any position between vertical and horizontal. The horizontal position represents a storage position for the shield which is then not in use. All other positions are determined by the height of the driver and the driving conditions.

DETAILED DESCRIPTION OF PREFERRED EMBODIMENTS

Figure 1:
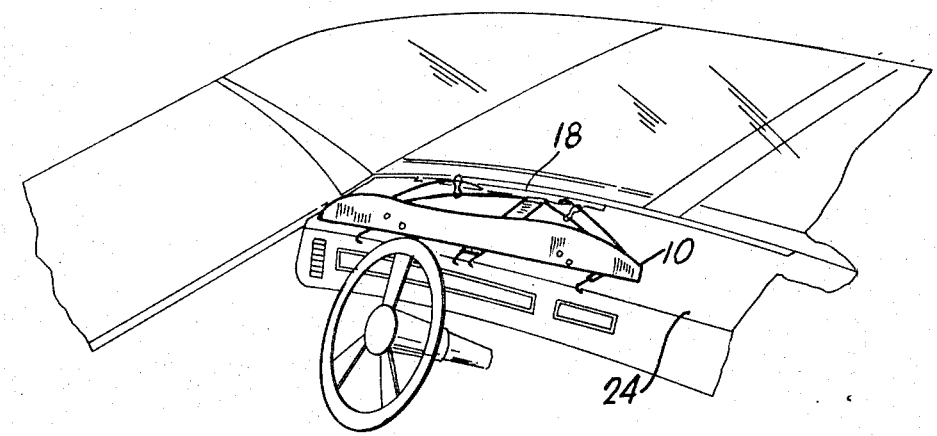
FIG. 1 is a perspective view of the invention in use.
Figure 2:
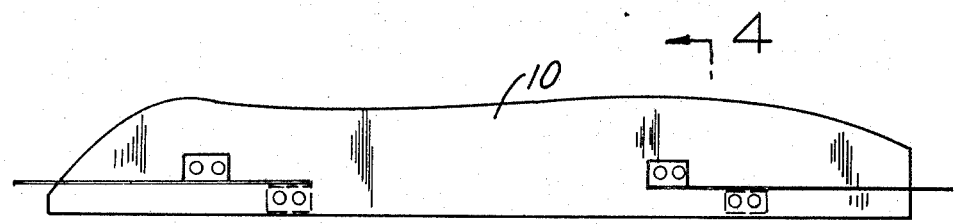
FIG. 2 is a front elevation of the shield.
Figure 3:
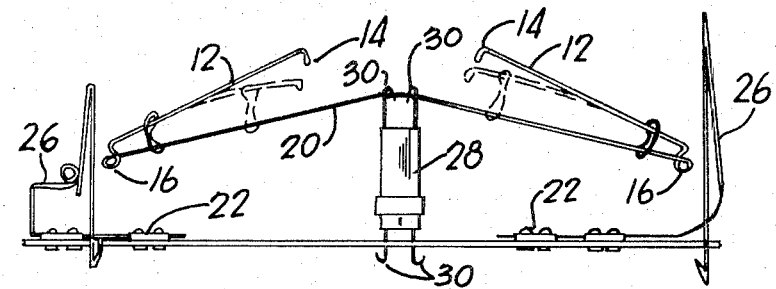
FIG. 3 is a plan of the apparatus used to control the position of the shield.
Figure 4:
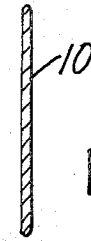
FIG. 4 is a section taken along line 4—4 in FIG. 2.

Referring now to FIGS. 1-4, an elongated opaque thin panel or shield 10 extends horizontally across the driver's portion of the instrument panel 24. Hangers 12 have clips 14 engaging the defroster vents 18 in panel 24 and extend outward and downward to loops 16 connected to left hand and right hand brakets 26. The loops are interconnected by a transverse wire 20, and brackets 26 are secured to panel 24. Pivot arms 22 are secured to upper part of brackets 26 and the shield 10. An elastic strip 28 is secured by clips 30 to the wire 20, and the front edge of the panel 24, closest to the driver.

As a result, the shield can be manually pivoted to any position between vertical and horizontal to shield the driver's needs. The mechanism is such that the shield will be held accurately and firmly in any position desired. The shield can be disposed horizontally when not in use.

While I have described my invention with particular reference to the drawings, such is not to be considered as limiting its actual scope.

Having thus described this invention, what I claim as new is:

1. In combination with a vehicle having an instrument panel disposed in front of the driver and behind the windshield and having defroster vents:
   an elongated thin horizontal opaque shield which extends across that portion of the panel in front of the driver;
   hangers having clips engaging the defroster vents;
   said hangers having loops interconnected by a transverse wire;
   clips connecting the center of said transverse wire to the front edge of the panel toward the driver;
   brackets secured to the panel and connected to said loops; and
   pivot arms secured to the upper parts of the brackets and secured to the shield.

* * * * *